United States Patent
Verbrugge et al.

(10) Patent No.: US 9,118,073 B2
(45) Date of Patent: Aug. 25, 2015

(54) FADE-RESISTANT HIGH CAPACITY ELECTRODES FOR A LITHIUM-ION BATTERY

(71) Applicant: GM GLOBAL TECHNOLOGY OPERATIONS LLC, Detroit, MI (US)

(72) Inventors: Mark W. Verbrugge, Troy, MI (US); Sampath K. Vanimisetti, Karnataka (IN); Ramakrishnan Narayanrao, Karnataka (IN)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/612,454

(22) Filed: Feb. 3, 2015

(65) Prior Publication Data
US 2015/0144494 A1    May 28, 2015

Related U.S. Application Data

(62) Division of application No. 13/355,623, filed on Jan. 23, 2012, now Pat. No. 9,012,075.

(51) Int. Cl.
| | |
|---|---|
| *H01M 4/36* | (2006.01) |
| *H01M 4/13* | (2010.01) |
| *H01M 4/134* | (2010.01) |
| *H01M 4/38* | (2006.01) |
| H01M 4/02 | (2006.01) |

(52) U.S. Cl.
CPC ............... *H01M 4/366* (2013.01); *H01M 4/13* (2013.01); *H01M 4/134* (2013.01); *H01M 4/38* (2013.01); *H01M 4/386* (2013.01); *H01M 2004/021* (2013.01)

(58) Field of Classification Search
CPC ....... H01M 4/366; H01M 4/13; H01M 4/134; H01M 4/386; H01M 4/38
See application file for complete search history.

(56) References Cited

U.S. PATENT DOCUMENTS

| | | | |
|---|---|---|---|
| 2003/0175585 A1 | 9/2003 | Ugaji et al. | |
| 2011/0159365 A1 | 6/2011 | Loveness et al. | |

FOREIGN PATENT DOCUMENTS

| | | | |
|---|---|---|---|
| CN | 101849307 A | 9/2010 | |

OTHER PUBLICATIONS

Candace K. Chan et al., High-performance lithium battery anodes using silicon nanowires; nature nanotechnology/ vol. 3; Jan. 2008; pp. 31-35.

(Continued)

*Primary Examiner* — Helen O Conley
(74) *Attorney, Agent, or Firm* — Reising Ethington P.C.

(57) ABSTRACT

The gravimetric and volumetric efficiency of lithium ion batteries may be increased if higher capacity materials like tin and silicon are substituted for carbon as the lithium-accepting host in the negative electrode of the battery. But both tin and silicon, when fully charged with lithium, undergo expansions of up to 300% and generate appreciable internal stresses. These internal stresses, which will develop on each discharge-charge cycle, may lead to a progressive reduction in battery capacity, also known as battery fade. The effects of the internal stresses may be significantly reduced by partially embedding tin or silicon nanowires in the current collector. Additional benefit may be obtained if a 5 to 50% portion of the nanowire length at its embedded end are coated or masked with a composition which impedes lithium diffusion. Methods for embedding and masking the nanowires are described.

20 Claims, 5 Drawing Sheets

(56) References Cited

OTHER PUBLICATIONS

Taeseupsong et al.; Arrays of Sealed Silicon Nanotubes as Anodes for Lithium Ion Batteries; American Chemical Society; DOI: 10.1021/nl100086a; Nano Lett. 2010; pp. 1710-1716.

Huixin Chen et al; Silicon nanowires with and without carbon coating as anode materials for lithium-ion batteries; J Solid State Electrochem (2010) 14: pp. 1829-1834; DOI 10. 1007/s10008-009-4.

Rutooj Deshpande et al; Modeling diffusion-induced stress in nanowire electrode structures; Journal of Power Sources 195 (2010) pp. 5081-5088.

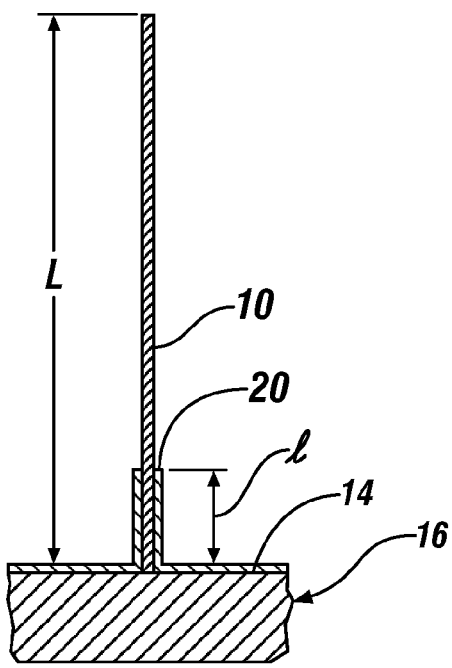
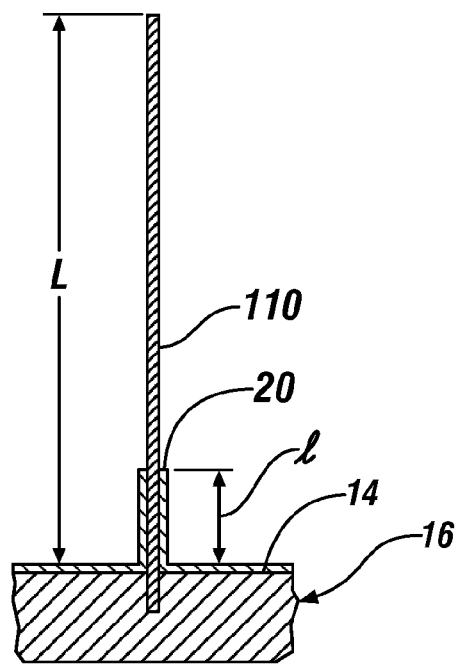
FIG. 3A    FIG. 3B
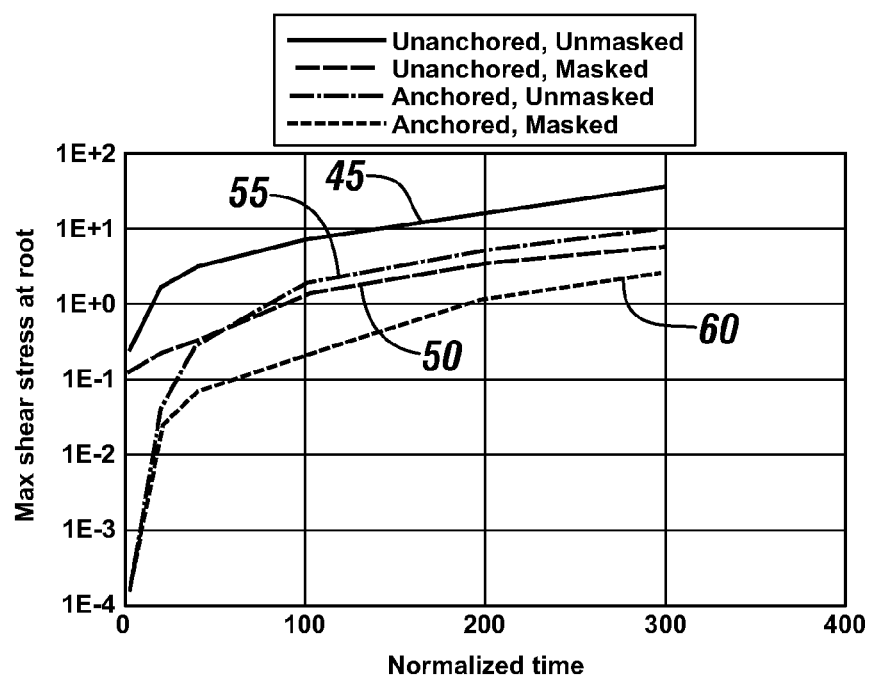
FIG. 5

FADE-RESISTANT HIGH CAPACITY ELECTRODES FOR A LITHIUM-ION BATTERY

CROSS-REFERENCE TO RELATED APPLICATION

This application is a divisional of U.S. patent application Ser. No. 13/355,623, filed Jan. 23, 2012, the entire contents of which are hereby incorporated by reference.

TECHNICAL FIELD

This invention pertains to electrode materials and structures for the cells of lithium-ion batteries in which lithium atoms are repeatedly inserted into and removed from small, wire-like shapes of negative electrode active material during charging and discharging of the battery. More specifically, this invention pertains to methods and treatments for attaching such wire-like, high capacity electrode materials to a current collector substrate to enhance battery life.

BACKGROUND OF THE INVENTION

Secondary or rechargeable lithium-ion batteries may be used as electric storage systems for powering electric and hybrid electric vehicles. These batteries comprise a plurality of suitably interconnected electrochemical cells each of which undergoes a specific chemical reaction capable of generating electrical energy. When suitably arranged, these cells provide a predetermined electrical current at a specified electrical potential to an external load, such as an electric motor. Such a battery may be re-charged by supplying electrical energy to the battery to reverse the chemical reaction undergone at the electrodes and render the battery again capable of delivering electrical power. Of course, there is continuing interest in higher capacity cells which enable extended use before recharging is required.

In principle, this cycle of charge and discharge may be continued indefinitely, but in practice, each cycle is less than fully reversible and so the capacity of the battery will be reduced or 'fade' with continued use. After some period of use, or some number of charge discharge cycles, the extent of fade or capacity reduction will be sufficient to render the battery unsuitable for its intended application and require that it be replaced.

In each cell of a lithium battery, on discharge, lithium is transported as lithium ions from a negative electrode through a non-aqueous, lithium-containing, electrolyte solution to a lithium-accepting positive electrode as an electronic current is delivered from the battery to an external load, for example, in a vehicle, an electric traction motor. A suitable porous separator material, infiltrated with the electrolyte solution and permeable to the transport of lithium ions in the electrolyte, is employed to prevent short-circuiting physical contact between the electrodes.

Graphite has been commonly used as a negative electrode material in such batteries and is commonly employed as a thin electrode layer bonded to a copper current collector. During charging of the cells, lithium is inserted into the graphite (lithiation, forming $LiC_6$, with a capacity of about 372 mAh/g) and extracted from the graphitic carbon during discharging (de-lithiation).

A suitable particulate material for receiving and storing inserted lithium during discharge of each cell is used as the positive electrode material. Examples of such positive electrode materials include lithium cobalt oxide ($LiCoO_2$), a spinel lithium transition metal oxide such as spinel lithium manganese oxide ($LiMn_2O_4$), a lithium polyanion such as a nickel-manganese-cobalt oxide [$Li(Ni_xMn_yCo_z)O_2$, where x+y+z=1], lithium iron phosphate ($LiFePO_4$), or lithium fluorophosphate ($Li_2FePO_4F$), or a mixture of any of these materials. Suitable positive electrode materials are often bonded as a thin layer on an aluminum current collector. The electrochemical potential of such lithium ion cells is typically in the range of about 2 to 4.5 volts.

The use of lithium-ion batteries to power electric motors in automotive vehicles has led to the need for higher gravimetric and/or volumetric capacity batteries. While graphitic carbon is a durable and useful lithium-intercalating, negative electrode material for lithium-ion cells, it has a relatively low capacity for such lithium insertion. Other potential negative electrode materials such as silicon (theoretical capacity, 3578 mAh/g for $Li_{15}Si_4$) and tin (theoretical capacity, 994 mAh/g for $Li_{22}Sn_5$) have much higher theoretical capacities than graphite for lithium insertion.

However, unlike graphite, silicon undergoes a volume change that can exceed 300 volume percent during the course of lithiation and reverses during de-lithiation. Tin exhibits similar behavior. Such dramatic volume changes may induce, in the lithiated silicon, appreciable stresses which may lead to fracture of the active silicon material and/or loss of electrical contact by the silicon and its current collector. This loss of contact is manifested by a rapid reduction in the electrical storage capacity of the battery; that is rapid fade.

Loss of battery capacity resulting from the fracture of the electrode materials in its cells may result from loss of electrical contact with conductive material and the creation of new surfaces which irreversibly consume the active lithium to form new solid electrolyte interfaces. And, of course, any lithium entrained within the fractured, separated electrode material is irretrievably lost.

Thus there remains a need for a more effective way of utilizing high energy capacity negative electrode materials such as silicon or tin to enable development of a high-capacity, fade resistant lithium ion battery.

SUMMARY OF THE INVENTION

This invention pertains to lithium-ion electrochemical cells that use high capacity negative electrode materials, such as silicon and tin, for absorbing and de-sorbing lithium during repeated cycling of the cell. As stated, such electrode materials typically experience significant volume change as lithium is absorbed or released. In accordance with embodiments of the invention, such negative electrode materials are used in the form of elongated rod-like or pillar-like structures, often as nanowires or in other relatively long, thin (nanometer size thicknesses) shapes for providing abundant surface area for contact with a liquid lithium-ion containing electrolyte. The nanowires or thin shapes may have a diameter or cross-section thickness of, for example, 20 nanometers to 200 nanometers and a length (or height) of 1 to 100 micrometers. These upstanding nanowires or nanowire shapes may be present in an areal density of from about $10^6$ to $10^{12}$ per square millimeter of current collector surface.

The nanowires or long, thin shapes of electrode material, may be oriented generally parallel to one another and extend outwardly into the electrolyte. One end of the nanowires may be attached to, and in electrical contact with, a metal current collector for conduction of electrons from and to the active (electrode) material.

The process of lithiation will begin with deposition and absorption of lithium at the wire surface and proceed by diffusion of lithium into the wire interior. The rate of lithiation will depend on some combination of how rapidly the surface lithium may diffuse into the wire interior, depleting the wire surface of lithium as it does so, and how rapidly additional lithium may be transported through the ion-conducting electrolyte to replenish the lithium on the wire surface.

Generally, diffusion of the lithium into the solid wire will proceed more slowly than transport of lithium through the liquid electrolyte. This will lead to the development of a concentration gradient extending radially inwards from the wire surface to its interior and persist until the wire is fully lithiated throughout its volume. Release of lithium from the now-lithiated wire will likewise establish a concentration gradient, but a gradient of opposite sign than that developed during lithiation.

Because the expansion experienced by the wire will be proportional to its lithium concentration, the presence of a concentration gradient will lead to a volume expansion gradient in the wire. This volume expansion mis-match between adjacent portions of the wire will lead to the development of stresses throughout the wire and especially at the point of attachment of the wire to its current collector, where the volume expansion is restricted.

In accordance with an embodiment of the invention, the magnitude of the stresses may be reduced or mitigated by modification of the character of the joint between the current collector and the wire by embedding an end of the nanowire in the collector. In another embodiment, access of lithium to the nanowire may be selectively restricted to modify the nature of the concentration gradient in some portion of the wire by circumferentially coating a portion of the nanowire with a coating or mask which serves to bar radial diffusion. Both approaches will induce longitudinal diffusion, that is, diffusion along the nanowire length, in the embedded or coated/masked portion of the nanowire. These approaches are effective in reducing the stresses in the electrode during both a single cycle and over multiple cycles. They are thus effective in reducing electrode fracture due to stresses induced during a single discharge-charge cycle and multiple discharge-charge cycles, or stated differently, under uniaxial loading and cyclic loading.

Embedding or coating the nanowires, and thereby enforcing longitudinal diffusion rather than radial diffusion, will reduce the rate of charge of a battery with such a nanowire electrode. If charging time is limited this may result in an effective loss of battery capacity. Hence the proportions of masked and unmasked lengths of the nanowires may be selected to suitably reduce electrode material stresses while enabling a predetermined battery capacity and/or charging rate.

Commonly an end of the wire is joined to the current collector using a butt joint in which one end of the wire is abutted to the surface of the collector in end to surface configuration and then attached to the surface by forming a generally planar joint at the abutting surfaces as schematically shown at FIG. 1. During lithiation, expansion of the section of the wire immediately adjacent to the joint plane will induce shear and tensile stresses at the joint, which, if severe enough, or if repeated often enough, may lead to failure of the joint.

In an embodiment of this invention the wire is partially embedded in the current collector so that the wire, sized to the dimension of a supporting blind hole of suitable length, is anchored over a portion of its length as shown in FIG. 2. Such a structure may be fabricated by the steps of:

a. Applying a layer of photoresist with a thickness of between about 500 and 2000 nanometers to at least one surface of an electrically-conducting current collector, commonly fabricated of copper.

b. Exposing, through a suitable mask, the photoresist to ultraviolet or deep ultraviolet light of wavelength between 436 and 193 nanometers to pattern the photoresist.

c. Removing the unexposed photoresist to leave a patterned, adherent and etch-resistant photoresist coating on the collector surface, the pattern defining exposed, generally circular surface regions with a diameter of about the nanowire diameter separated by coated regions; suitably the density of exposed regions will be consistent with the preferred nanowire density of between $10^6$ and $10^{12}$ nanowires per square millimeter.

d. Etching the surface of the collector with a suitable etchant, to create cavities extending about 5 or so micrometers which extend only part-way through the collector e. Applying a catalyst such as gold for promoting growth of a suitable negative electrode material.

f. Removing the photoresist, and g. Growing nanowires or tubes of the suitable negative electrode material using physical or vapor deposition techniques. For example, silicon may be deposited from a $SiH_4/H_2$ mixed gas flow at a temperature of about 550° C. or so.

In another embodiment, which may be employed alone or in combination with the first embodiment, the lower exposed portion of the nanowires may be circumferentially coated with a layer of a composition, for example gold, copper, nickel or titanium which substantially bars lithium diffusion as shown at FIGS. 3A and 3B. With this circumferential coating, diffusion of lithium into the coating-covered portion of the nanowires will proceed substantially longitudinally along the length of the nanowires rather than radially inward. This will establish a more planar diffusion front across the width of the nanowires and serve to reduce stresses, particularly stresses at the plane of attachment of the nanowire to the current collector.

The thickness of the diffusion barrier may range from about 1 nanometer to about 20% of the nanowire diameter. Suitably the barrier coating may be a metal, ceramic or polymer, with metals and polymers being favored for ductility and ceramics preferred for use in environments unsuited for metals and polymers. Unsuitable environments may include, for example, those environments which react with or dissolve the coating. Because materials at nano-thicknesses behave differently than when in bulk form, even ceramic coatings, if very thin, may exhibit adequate ductility to conform to the nanowire as it changes diameter during a discharge-charge cycle.

In some circumstances the effects of anchoring the nanowire in the current collector and establishing a mask or diffusion barrier over some portion of its length will be additive and may be synergistic. But, it will be appreciated that a copper current collector will serve as a diffusion barrier for that portion of the nanowire which is anchored in the collector. To achieve an additional reduction in stress the diffusion barrier should be deformable and flexible, extending along a portion of the length to manage diffusion gradients and hence the stress. A longer masking length tends to smooth out the concentration gradients and stresses at the root, a desirable result. But a longer masking length will inhibit diffusion of lithium and therefore reduce the charge/discharge rates.

A diffusion barrier layer may be located on that portion of the nanowire adjacent to the joint between the nanowires and the current collector by the following procedure, which is additive to the procedure employed to affix the nanowires to the current collector.

h. Coat the entire current collector surface with photoresist to a thickness generally equal to the preferred longitudinal extent of the barrier coating, generally between 5% and 50%, and preferably between 5 and 15%, of the length of the nanowire i. Apply, by low temperature CVD, a thin layer of aluminum, approximately 20 to 50 nanometers micrometers thick, on those portions of the nanowires which extend above the level of the photoresist; suitably alkyl aluminum and amine-alane adducts at a temperature of between 100° C. and 150° C. enable suitable coating thicknesses with process times of the order of minutes j. Anodize the aluminum to form a protective coating on that portion of the nanowires which extends above the level of the photoresist k. Dissolve the photoresist, using an alkali solution, or ash the photoresist to expose that (uncoated) portion of the nanowire extending from the electrode surface to the nanowires portion with the anodized coating l. Apply, to the uncoated portion of the nanofiber a layer of a lithium diffusion barrier such as copper, gold, titanium or nickel to a thickness of at least about 10 nanometers metal plating m. Dissolve, by application of caustic solution, the protective $Al_2O_3$ shell from the uncoated length of the nanowires.

Providing a diffusion barrier at the attachment end of the wire is effective in reducing the stress. But by inhibiting radial diffusion over a portion of the nanowires length, the overall rate at which lithium may be inserted or removed from the nanowires is decreased. This manifests itself as an increase in battery charging time, or, if charging time is fixed, potentially as a reduced available capacity relative to an uncoated fiber. Of course the greater capacity of the nanowires, particularly silicon nanowires, over a carbon-based electrode will, under any reasonable coating length, still result in a higher capacity battery than those currently available using carbon-based electrodes. The magnitude of the stress reduction, and so the anticipated battery life, will similarly increase with increasing length of the diffusion-inhibiting coating. These effects of diffusion barrier length thus require trading off the increase in battery charging time with the stress reduction.

Because the concentration gradient for the lithium will vary with position and change over time, the spatial and temporal stress distribution will likewise vary. But, in assessing the potential for damage to the nanowires, the most important parameter is the maximum stress developed. When such a stress develops is not important and it is the relationship between the (known) potential failure location and the spatial location of the maximum stress which is most relevant to anticipating nanowires failure. Hence the magnitude of the maximum stress developed is an appropriate figure of merit in assessing the utility of various stress-mitigating strategies.

Computer modeling demonstrates that the maximum stress decreases more rapidly with the length of the diffusion-inhibiting layer. Generally an acceptable trade-off between stress reduction and charging time may be obtained when the coating length is at least about 5% of the nanowire length. Further benefit may be obtained with coatings extending up to about 50% of the nanowire length but a preferred range lies between about 5% and 25% of the nanowire length with a most preferred range lying between about 5% and about 15% of the nanowire length. For example, when about 25% of the nanowire's length is coated with the diffusion-inhibiting coating, the charging time, relative to an uncoated nanowire is increased by about 33% while the stress is decreased by a factor of 10, again relative to an uncoated nanowire.

Suitable negative electrode materials include silicon or tin. Such an electrode with its high areal density (between about $10^6$ to $10^{12}$ per square millimeter) of upstanding wires or wire shapes per unit area of current collector surface, would, when incorporated into a lithium ion battery, serve to improve the gravimetric and volumetric efficiency of such a cell relative to a graphite based electrode composition. By application of the above-described embodiments such efficiency enhancement may be achieved without unacceptably increasing battery fade, thereby enabling a durable high capacity lithium ion cell.

Other objects and advantages of the invention will be apparent from detailed descriptions of practices for forming and masking the nanowire structures and arrangements. Reference will be had to illustrative drawing figures which are described in the following section of this specification.

BRIEF DESCRIPTION OF THE DRAWINGS

FIGS. 3A-B show, in cross-section the butt joined nanowire shown in FIG. 1 (FIG. 3A) and the partially embedded, anchored nanowire shown in FIG. 2 (FIG. 3B) after application of a coating over only a portion of the nanowires. The coating is intended to mask that portion of the nanowires to which it is applied to inhibit diffusion of lithium at the masked region.

FIGS. 4 A-D show computer simulation results (FIGS. 4B-D) on the stresses obtained in a nanowires butt jointed to the current collector surface as shown in FIG. 4A.

FIG. 5 shows the evolution of maximum shear stresses with normalized diffusion time for four nanowire attachment schemes FIGS. 6 A-G show, in schematic cross-section, a sequence of steps in preparing a current collector with a number of blind holes to accommodate and anchor a plurality of nanowires.

DESCRIPTION OF PREFERRED EMBODIMENTS

Figure 1:
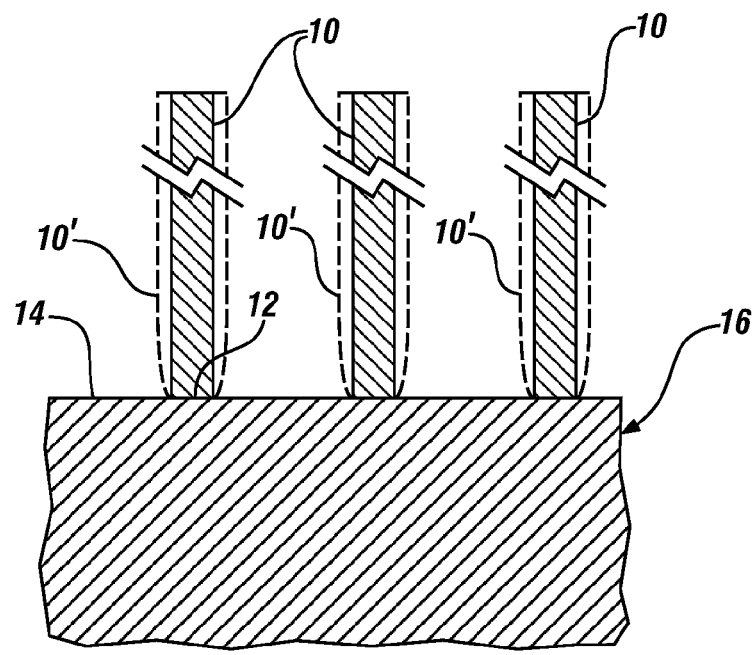
FIG. 1 is a highly enlarged, fragmentary schematic representation of showing one means of attaching nanowires to a current collector. One end of each of the nanowires is attached to the surface of a current collector to form a butt joint with a generally planar joint interface. The nanowires are shown in configurations representative of their de-lithiated state, and, in broken-line outline, in their lithiated state. The attachment scheme shown is representative of that for each of the many nanowires which may be present, typically in areal density of between about $10^6$ and $10^{12}$ per square millimeter of current collector surface.

Lithium ion batteries generally comprise a plurality of interconnected individual cells arranged so as to satisfy the voltage and electrical energy storage, or capacity requirements, of a particular application. Each cell is of substantially identical construction and chemistry and incorporates facing negative and positive electrodes each of which is mounted on, or attached to, an electrically conductive current collector commonly fabricated of copper (for the negative electrode) and aluminum (for the positive electrode). The electrodes are held in spaced-apart relation by a spacer which fills the gap between the electrodes but is adapted to enable a continuous conductive path for lithium ions from one electrode to the other. Often the spacer is a porous polymer layer in which the pores extend from one surface to the other. When the pores are infiltrated with a lithium ion-conducting, non-aqueous liquid electrolyte, lithium ions may pass from one electrode to the other. The direction of motion of the ions depending on whether the cell is discharging or being recharged.

Some suitable lithium salts that may be used to make a liquid electrolyte solution include $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, $LiPF_6$, and a mixture that includes one or more of these salts. The lithium salt is dissolved in a non-aqueous solvent which may be a cyclic carbonate (i.e., ethylene carbonate, propylene carbonate), an acyclic carbonate (i.e., dimethyl carbonate, diethyl carbonate, ethylmethylcarbonate), an aliphatic carboxylic ester (i.e., methyl formate, methyl acetate, methyl propionate), a γ-lactone (i.e., γ-butyrolactone, γ-valerolactone), an acyclic ether (i.e., 1,2-dimethoxyethane, 1,2-diethoxyethane, ethoxymethoxyethane), a cyclic ether (i.e., tetrahydrofuran, 2-methyltetrahydrofuran), or a mixture that includes one or more of these solvents.

Manufacturers and users of lithium ion batteries have interest in improving the durability and gravimetric and/or volumetric efficiency of such batteries. One opportunity for improved battery efficiency is to use a negative electrode material better able to absorb lithium ions than the graphite-based electrode in common use. Suitable electrode materials may include the metals silicon and tin and their alloys which exhibit theoretical capacities of 3578 mAh/g (for $Li_{15}Si_4$) and 994 mAh/g (for $Li_{22}Sn_5$) respectively, either of which substantially exceeds the capacity of graphite (which forms $LiC_6$), with a capacity of about 372 mAh/g. However the more closely-packed (than graphite), crystal structures of silicon and tin undergo significant volumetric expansion when lithium is introduced into their crystal lattice during a charging cycle. The volume expansion is non-uniform throughout the electrode and so may generate significant stresses in the electrode. These stresses are capable of fracturing the electrode material, particularly bulk electrode material, causing some portion of the electrode material to fragment or spall off and so reducing the volume of the electrode participating in the cell electrochemical reaction. This behavior may re-occur on subsequent charge cycles to progressively reduce the cell and battery capacity and lead to battery fade.

Some benefit may be obtained by using these high capacity electrode materials in the form of densely-packed, elongated rod-like or pillar-like structures rather than as bulk electrode material. These rod-like structures may be nanowires of say 20 to 200 nanometers in diameter, 1 to 100 micrometers in length and present in areal densities of from $10^6$ to $10^{12}$ per square millimeter. This forest of nanowires will project out from the current collector and be infiltrated and surrounded by lithium ion-conducting electrolyte. But appreciable stresses still obtain, and fracture of the nanowires or fracture of the bond physically securing the nanowires to the current collector and enabling electronic conduction between the current collector and electrode material, may still result.

FIG. 1 shows a representative cross-sectional depiction of a typical nanowire 10, before lithiation joined by a generally planar butt joint 12 to a surface 14 of a current collector 16, typically fabricated of copper. After lithiation, nanowire 10', shown in broken-line outline, expands, primarily radially, but is restrained from expansion at, and by, joint 12. As will be described in greater detail below, the expansion and the restraint imposed by the joint 12 induce stresses both at the joint and along the length of the nanowires.

Figure 2:
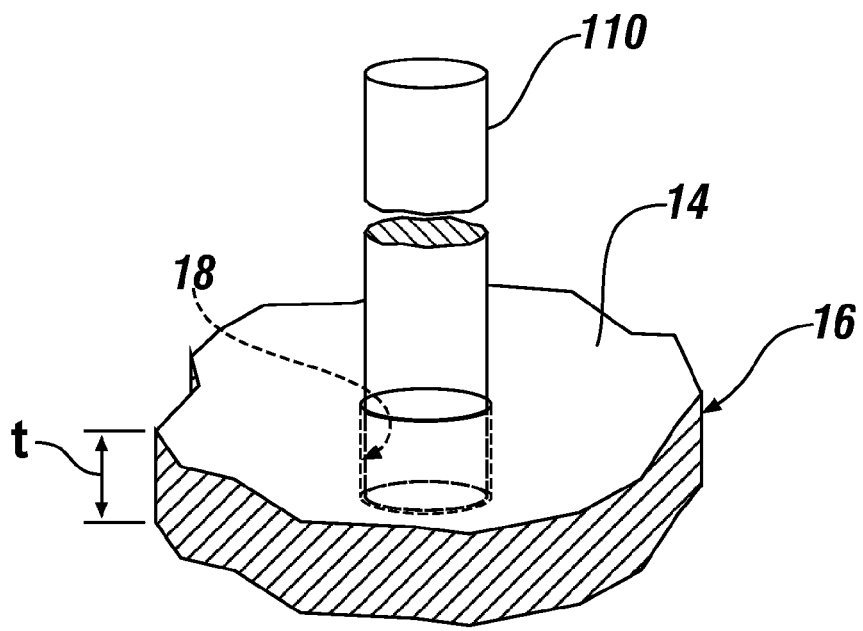
FIG. 2 is a highly enlarged schematic perspective illustration of a single nanowire of a high capacity lithium-accepting material partially embedded and anchored in a fragment of a current collector. The structure shown is representative of the attachment scheme for each of the many nanowires which may be present, typically in areal density of between about $10^6$ and $10^{12}$ per square millimeter of current collector surface.

In an embodiment of the invention shown in FIG. 2, nanowire 110 is also secured to current collector 16, but in this embodiment is anchored within cavity 18, extending below surface 14 and part-way through the thickness, t, of the current collector 16. Anchoring the nanowires to the current collector in this fashion is effective in reducing the stresses resulting from lithiation of the nanowire.

In another embodiment of the invention shown in FIG. 3A, the butt-jointed nanowire 10 of FIG. 1 is coated or masked over a length, l, a portion of its overall length, L. The mask 20, which may suitably extend from about 5% to 50% of the overall length, L, of the nanowire should be of a composition suitable for suppressing or restricting passage of lithium and so slow transfer of lithium into the nanowire over the length, l, of the mask. In a method of practicing this embodiment, to be described later, mask 20 may also be deposited on surface 14 of current collector 16, as shown, but deposit of the diffusion-inhibiting mask layer on the collector surface is not required and deposit on the nanowires alone is sufficient for practice of the invention. FIG. 3B shows an analogous, anchored nanowire 110 after deposit of mask 20.

Figure 4A:
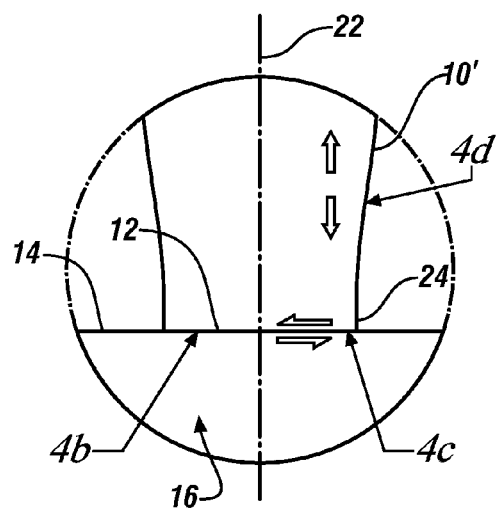
FIG. 4A depicts, in cross-section, the morphology of such a nanowire after lithiation.
Figure 4B:
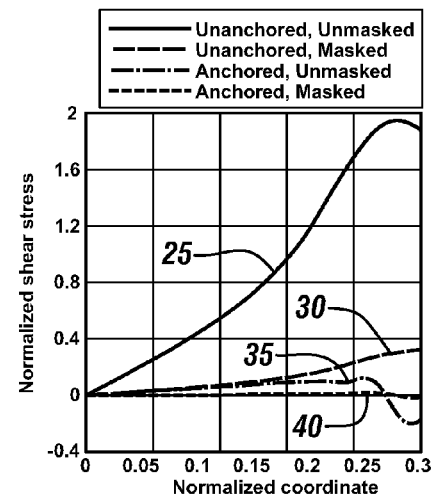
FIG. 4B shows the normalized shear stress, responsible for current collector interface failure, developed at the nanowire-current collector interface as a function of radial position.
Figure 4C:
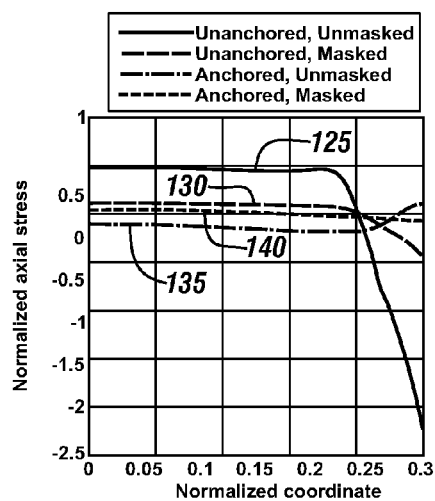
FIG. 4C shows the normalized axial stress developed at the nanowire-current collector interface as a function of radial position.
Figure 4D:
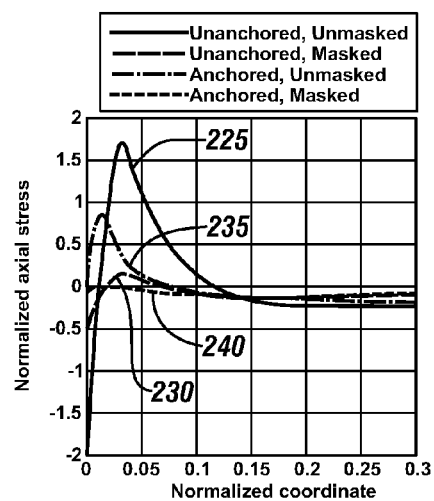
FIG. 4D shows the normalized axial stress, responsible for nanowire failures distant from the current collector-nanowire interface, along the length of the nanowires.

FIG. 4A shows, in greater detail, the geometry of a portion of a lithiated nanowire, attached as shown in FIG. 1, while FIGS. 4B-D show computed spatially-varying stresses which may result from such lithiation under the assumption of nanowires 10 being surrounded by electrolyte containing a fixed concentration of lithium ions. FIGS. 4B-D show the computed maximum stresses, normalized for more direct comparison. Each of the curves in FIGS. 4B-D corresponds to a particular nanowire configuration: Curves 25, 125 and 225 correspond to the butt jointed configuration of FIG. 1; Curves 30, 130 and 230 correspond to the butt-jointed, partially masked configuration of FIG. 3A; curves 35, 135 and 235 correspond to the anchored configuration of FIG. 2; and curves 40, 140 and 240 correspond to the anchored and masked configuration of FIG. 3B.

Each of the graphs of FIGS. 4B-D corresponds to a particular stress at particular locations on the nanowire indicated by the arrows on FIG. 4A, where stresses arising at locations as 4a, 4b, and 4c are shown in corresponding FIGS. 4B, 4C and 4D. FIG. 4B shows the interfacial shear stress as a function of normalized radial location between centerline 22 and nanowires surface 24; FIG. 4C shows the axial stress at the joint, again as a function of normalized radial location; while FIG. 4D shows the axial stress along the length of the nanowire normalized to the overall wire length taking the joint interface as the origin.

In all cases the butt jointed configuration of FIG. 1 shows, over at least some portion of the nanowire or joint, an elevated normalized stress relative to the other configurations. The most dramatic condition is shown by the variation in radial shear stress at the joint shown in FIG. 4B, demonstrating significant and major stress development during lithiation and clearly indicating an enhanced likelihood that the nanowire may shear off and become separated from the current collector during lithiation. This outcome may be promoted by any pre-existing flaws in the nanowire or by flaws and irregularities introduced by prior lithiation and delithiation events. Curve 125 of FIG. 4C demonstrates elevated normal stress levels at the joint, relative to the other joint configurations, except close to and at surface 24. While curve 225 of FIG. 4D shows a large spike in surface stress at a location a distance of 0.03 times the length of the nanowire from the joint, suggesting that fracture of the wire might occur at that location. Either, separation of the nanowire from the current collector or a 97% reduction in the length of the nanowire resulting from nanowire fracture at only 0.03 of its length, will dramatically reduce the volume of nanowires capable of participating in the electrochemical reaction leading to reduced battery capacity and fade.

The magnitude of all of the stresses may be reduced by either masking 25% of the nanowire (curves 30, 130, 230), anchoring the nanowire (curves 35, 135, 23) or, most effectively, by both anchoring the nanowire and masking a portion of it (curves 40, 140, 240). When the nanowire is both anchored and masked the all three of the stresses are substantially reduced to zero, suggesting that fracture or separation of the nanowire on lithiation is unlikely to occur in the absence of particularly problematic flaws in the nanowires.

It will be appreciated that lithiation occurs progressively and that the stresses in the nanowire and at the joint will change and evolve with time. It is therefore important to establish whether or not the superiority of the anchored and coated joint demonstrated in FIGS. 4B-D persists over the entire lithiation process.

In FIG. 5A, the maximum shear stress at the (joint) root is plotted versus a normalized time. The normalized time generally corresponds to a scale-independent radial concentration profile in the fiber. That is, it is the time required to obtain a specified radial concentration profile through fibers of all diameters. At all normalized times, the stresses are a maximum for the butt-jointed fiber of FIG. 1, curve 45. The effect of anchoring the fiber as in FIG. 2 is to reduce the stresses at all times (curve 50) as is the effect of masking the butt jointed fibers depicted in FIG. 3A (curve 55). But the most effective approach, at all times and during the entire course of lithiation is to both anchor and mask the fiber (FIG. 3B) which is shown as curve 60. The effect of the combined effects of masking and anchoring the fiber is to reduce the maximum sheer stress at the root by at least a factor of 10 over the butt-jointed nanowire configuration of FIG. 1.

An exemplary procedure for growth of anchored nanowires is shown in FIGS. 6A-G which have been drawn with a view to illustrating the processing steps and not necessarily to properly scale or depict the dimension(s) of any of the identified features.

Figure 6A:
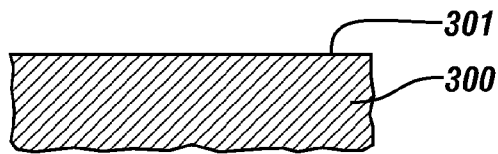
Figure 6B:
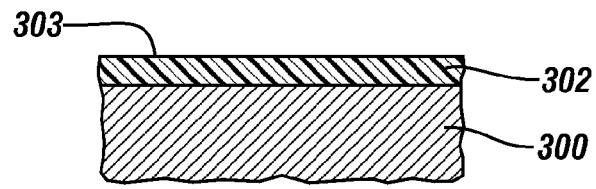

FIG. 6A shows a portion of a current collector 300 with a surface 301. Such current collectors, which for a negative electrode are commonly fabricated of copper, but may also be fabricated from stainless steel, nickel and titanium as well as gold, may be a foil of between 5 and 20 micrometers in thickness. In FIG. 6B, the collector 300 is shown with a surface coating of a positive photo resist 302, for example polymethyl methacrylate (PMMA) or diazoquinone and novolac (DQN). The photo resist may be applied by applying a suitable quantity, generally about 1 ml per square inch, of the liquid solution of photo resist on surface 301 and then spinning or rotating the collector at between 1000 and 6000 rpm to evenly distribute the solution to a thickness of about 500 to 2000 nanometers over the entire surface 301 of the collector 300, followed by evaporating the solvent.

Figure 6C:
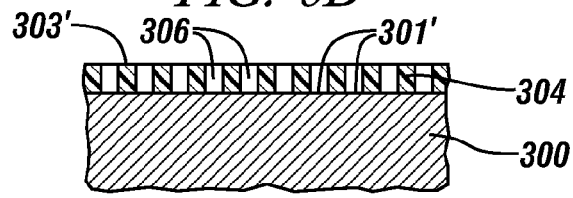

A patterned mask (not shown) adapted to allow transmission of ultraviolet light in some areas and block ultraviolet light in other areas is then applied to the surface 303 of the photo resist. Suitably the mask comprises a series of closely spaced regions, generally circular in shape, adapted to transmit ultraviolet light with each circular region being isolated from its neighbors and surrounded by a region adapted to block ultraviolet light. With a positive photo resist areas exposed to ultraviolet light will be rendered soluble in a developer. So, by applying developer to surface 303 after its exposure to ultraviolet light only the exposed regions of the photo resist will be removed, creating circular cavities 306 in the photo resist, the cavities extending from modified surface 303' of the exposed photo resist to portions 301' of surface 301 of the current collector 300 as shown at FIG. 6C. Remaining portions 304 of photo resist, located between cavities 306, block access to the current collector surface at those locations. The surface density of the circular regions of the mask should mimic the desired density of nanowires, typically between $10^6$ and $10^{12}$ nanowires per square millimeter, on the current collector surface.

Figure 6D:
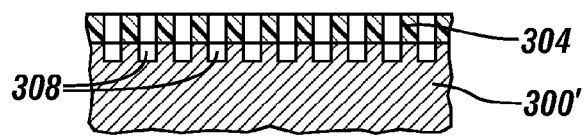

The pathway to collector surface created by cavity 306, may be employed to selectively apply etchant, for example a caustic solution of NaOH or KOH, to exposed collector surface 301' at the base of cavity 306. After application of etchant, an array of cavities 308, mimicking the pattern of the mask will be formed in collector 300' as shown at FIG. 6D.

Figure 6E:
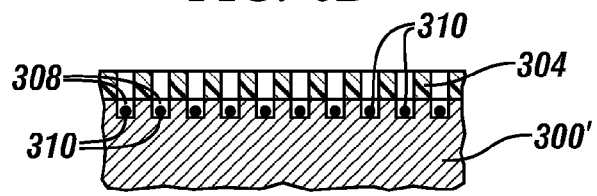
Figure 6F:
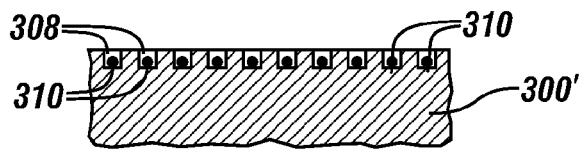

Following application, for example by chemical or physical vapor deposition, of a catalyst, such as iron or gold to surface 301', a catalyst particle or nanometer cluster 310 may be positioned in at least a plurality of cavities 308 in collector 301' as shown in FIG. 6E. Following removal of the remaining photo resist using, for example a 1 mol/liter aqueous solution of KOH or NaOH, collector 300' will contain catalyst particles 310 in substantially all of cavities 308 as shown at FIG. 6F.

Figure 6G:
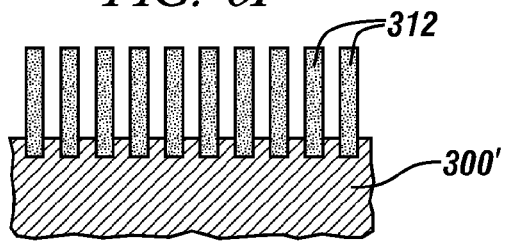

Silicon nanowires 312 anchored in substantially each of cavities are shown at FIG. 6G. Such nanowires may be formed by physical vapor deposition processes including magnetron sputtering cathode arc, e-beam evaporation or pulsed laser ablation. One suitable process may be CVD deposition of silicon from a flowing SiH4/H2 gas mixture at elevated at a temperature of about 550° C. or so.

While the just-described procedure is appropriate and suitable for anchoring the nanowires into the current collector surface, additional steps are required to apply a layer of diffusion resistant material to mask a portion of the nanowire at its point of attachment to the current collector.

A diffusion barrier layer may be located on that portion of the nanowire adjacent to the joint between the nanowires and the current collector by the following procedure, which is additive to the procedure employed to affix the nanowires to the current collector. Such a procedure is illustrated in FIGS. 7A-F.

Figure 7A:
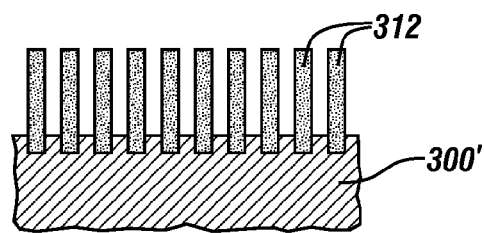
FIGS. 7A-F show, in schematic cross-section, a sequence of additional steps employed to selectively coat the root and an abutting portion of the embedded nanowires shown in of FIG. 6G with a diffusion-retarding coating.
Figure 7B:
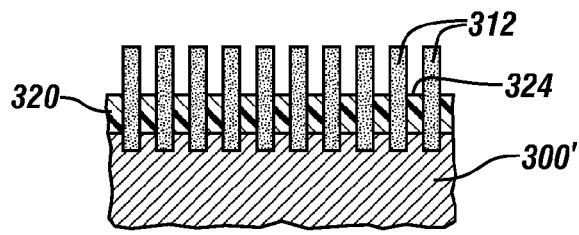
Figure 7C:
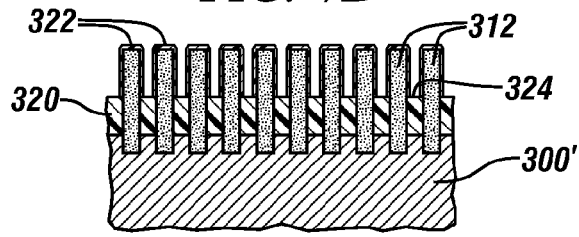

As shown in FIG. 7A the initial structure comprises a plurality of nanowires 312, partially embedded in current collector 300', that is the structure shown in FIG. 6G. Because the barrier layer is to be applied at the embedded end of the nanowire while the remainder is uncoated, a general procedure is to first apply a removable coating 320 (FIG. 7B) of suitable depth to the collector surface to immerse the embedded end of the nanowires to the preferred depth, indicated by coating surface 324. Photoresist may be a suitable material for the removable coating but achieving a coating thickness of from about 10 micrometers to 100 micrometers or so may require a high viscosity photoresist such as SU-8 2025 (available from Microchem, Newton Mass., USA). This photoresist, when spin-coated by rotating at about 1000 rpm results in a coating of about 80 micrometers thick. A coating layer of about 10 micrometers is obtained when rotating at between about 5000 to 6000 rpm. These coating thicknesses correspond quite well to the desired range of between about 10 and 100 micrometers corresponding to between 5% and 50% of the length of a 200 micrometer or so long nanowire.

After coating the entire current collector surface with a layer 320 of photoresist to a suitable thickness, a thin layer of aluminum 322 (FIG. 7C) may be deposited on those portions of each of the nanowires which extend above the upper surface of the photoresist by chemical vapor deposition (CVD). Suitably the thickness of aluminum ranges from approximately 20 to 50 nanometers. Preferably the CVD process is conducted at low temperature to minimize the extent of curing of the photoresist. It is preferred that the CVD process be conducted at a temperature lower than the 'Hard Bake' temperature of the photoresist, typically for SU-8, from 150° C. to 250° C. to facilitate subsequent removal of the photoresist. A suitable CVD procedure employs alkyl aluminum and amine-alane adducts at a temperature of between 100° C. and 150° C. This procedure may enable suitable coating thicknesses with process times of the order of minutes.

The deposited aluminum may then be anodized to form an electrically insulating coating 322' (FIG. 7D) on that portion of the nanowires which extends above the level of the photoresist. If necessary, any pores in the anodized coating may be filled. Such procedures are well known to those skilled in the art.

Figure 7D:
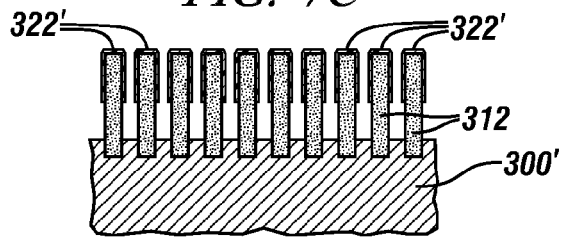
Figure 7E:
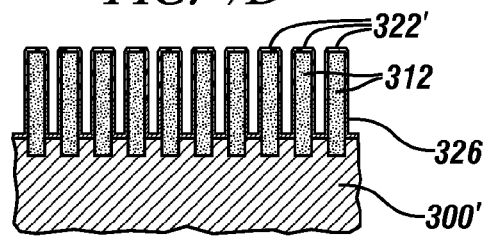
Figure 7F:
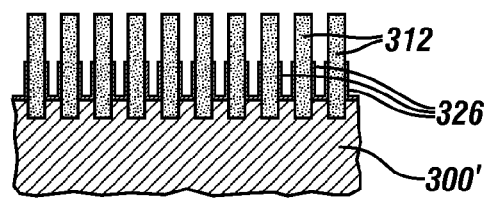

The photoresist may be removed, as shown in FIG. 7D either by using a solvent-based developer such as ethyl lactate and diacetonealcohol, or if extensive cross-linking has occurred during processing, by reactive ion etching in an oxygen-containing gas mixture or by using oxidizing acid solutions such as piranha etch.

Any surface oxide on the now-exposed portion of the nanowire may be etched off and the masking material 326 (FIG. 7E), suitably, and without limitation, copper, gold or nickel, applied by electroplating to a thickness of between 1 nanometer and about 20% of the nanowire diameter. Other coating procedures such as CVD may also be suitable and enable deposition of more reactive masking materials such as titanium. Any coatings should however be applied to only the uncoated (by alumina) portion of the nanofiber.

Then, dissolve, by application of caustic solution, the protective $Al_2O_3$ shell from the uncoated length of the nanowires to leave the masked, 326 collector-embedded nanowires 312 secured in collector 300'. If necessary, the portion of the nanowire which was coated with the (now-removed) alumina may be etched to restore a generally clean lithium-accommodating surface.

The above descriptions of embodiments of the invention are intended to illustrate the invention and not intended to limit the claimed scope of the invention.

The invention claimed is:

1. A method of fabricating a negative electrode for a lithium-ion battery, the electrode comprising a plurality of upstanding nanowires of a lithium-accepting composition, each embedded, at a lower end portion, in a metal current collector, the embedding of the end portions of the nanowires in the metal current collector structure of the electrode serving to reduce the stresses resulting from the expansion of the nanowires during diffusion of lithium into the lithium-accepting composition during charging of the battery, the method comprising the steps of:

preparing a surface of the metal current collector to accommodate the embedded end portions of a preselected density of nanowires of the lithium-accepting composition by masking the surface of the current collector with a removable mask adapted to bar access to the metal collector surface except at a plurality of generally circular openings in the mask, the density of the mask openings being equal to, or greater than, the preselected nanowire density; then etching the surface of the current collector with a suitable etchant for a predetermined time through the openings in the removable mask, the etchant and mask cooperating to create, at each mask opening, a cavity of suitable depth for the end portions of the nanowire, each cavity extending part-way through the current collector to produce, on the surface of the current collector, a plurality of such cavities;

depositing a metal catalyst within the cavities by chemical or physical vapor deposition, the catalyst being a particle or a nanometer cluster, the catalyst being selected and adapted to promote growth of the nanowires of the lithium-accepting composition;

removing the mask and growing nanowires of the lithium-accepting negative electrode composition from the catalyst particles by physical or vapor deposition, an end portion of the nanowires being anchored in the cavity and embedded in the current collector; and continuing to grow the nanowires until they extend above the surface of the current collector and achieve a predetermined length above the surface of the current collector.

2. The method of fabricating a negative electrode for a lithium ion battery recited in claim 1, in which the lithium-accepting composition comprises at least one of silicon and tin and the lithium-accepting nanowires range in diameter or cross-section thickness from 20 nanometers to 200 nanometers and range in length from 1 micrometer to 100 micrometers.

3. The method of fabricating a negative electrode for a lithium ion battery recited in claim 1 in which the current collector is a foil of between 5 and 20 micrometers in thickness fabricated from one of the group consisting of copper stainless steel, nickel, titanium, and gold.

4. The method of fabricating a negative electrode for a lithium ion battery recited in claim 1 in which the preselected density of nanowires of the lithium-accepting composition is at least $10^6$ nanowires per square millimeter.

5. The method of fabricating a negative electrode for a lithium ion battery recited in claim 2 in which the deposited catalyst comprises gold or iron and the lithium-accepting composition is silicon deposited from a $SiH_4/H_2$ mixed gas flow at a temperature of about 550° C.

6. The method of fabricating a negative electrode for a lithium ion battery recited in claim 1, further comprising applying a layer of a diffusion-inhibiting material for restricting diffusion of lithium into the nanowires over a portion of the predetermined length of the nanowires, the diffusion-inhibiting material layer being applied to that segment of the nanowires proximate the current collector surface, the diffusion-inhibiting material layer extending from the current collector surface part-way along the predetermined length of the upstanding nanowires, the method comprising:

applying a removable coating to the current collector surface to encase a first portion of each of the nanowires proximate the current collector surface while leaving a second portion of each of the nanowires accessible for further reaction, the removable coating having a thickness, the thickness being generally equal to the preferred length of the diffusion-inhibiting layer;

applying a thin layer of aluminum to the accessible second portions of the nanowires;

anodizing the aluminum coating to render an electrically non-conducting coating of alumina on the accessible portions of the nanowires;

removing the removable coating;

applying, to the first portion of the nanowire a layer of a material which will serve to inhibit diffusion of lithium and so restrict access of lithium to the nanowire; and removing the alumina coating.

7. The method of fabricating a negative electrode for a lithium ion battery recited in claim 6 in which the aluminum is applied using a chemical vapor deposition process at a deposition temperature of between 100° C. and 150° C.

8. The method of fabricating a negative electrode for a lithium ion battery recited in claim 6 in which the diffusion-inhibiting material for restricting access of the lithium to the nanowire is one of copper, nickel and gold.

9. The method of fabricating a negative electrode for a lithium ion battery recited in claim 6 in which the diffusion-inhibiting material is applied by electroplating.

10. The method of fabricating a negative electrode for a lithium ion battery recited in claim 6 in which the nanowire is generally circular in cross-section and has a diameter, the diffusion-inhibiting material layer having a thickness ranging from about 1 nanometer to about 20% of the nanowire diameter.

11. The method of fabricating a negative electrode for a lithium ion battery recited in claim 6 in which the diffusion-inhibiting material layer is applied over between about 5% and 50% of the predetermined length of the nanowire.

12. A method of applying a layer for inhibiting diffusion of lithium to portions of a plurality of spaced-apart, nanowires of a lithium-accepting composition attached to, and extending outwardly from, a current collector, the nanowires having a length; the current collector and lithium-accepting nanowires comprising a negative electrode for a lithium-ion battery, the diffusion-inhibiting layer being selectively applied over only a portion of the length of the nanowires extending from the surface of the current collector part-way along the length of the nanowires and serving to manage the diffusion of lithium into the nanowires during charging of the battery, the method comprising:

applying a removable coating to the current collector surface to encase a first portion of each nanowire proximate the current collector while leaving a second portion of each nanowire accessible for further reaction, the removable coating having a thickness, the thickness being generally equal to the preferred length of the diffusion-inhibiting layer;

applying a thin layer of aluminum to the accessible portion of each nanowire;

anodizing the aluminum coating to render an electrically non-conducting coating of alumina on the accessible portion of each nanowire;

removing the removable coating;

applying, to the first portion of each nanowire, a diffusion-inhibiting layer of a material which will restrict access of lithium to each nanowire; and removing the alumina coating.

13. The method of applying a diffusion-inhibiting layer to portions of a plurality of spaced-apart, nanowires of a lithium-accepting composition recited in claim 12, in which the nanowires range in diameter or cross-section thickness from 20 nanometers to 200 nanometers and are up to 200 micrometers in length.

14. The method of applying a diffusion-inhibiting layer to portions of a plurality of spaced-apart, nanowires of a lithium-accepting composition recited in claim 12 in which the removable coating is a photoresist.

15. The method of applying a diffusion-inhibiting layer to portions of a plurality of spaced-apart, nanowires of a lithium-accepting composition recited in claim 12 in which the lithium-accepting composition comprises one or more of silicon and tin.

16. The method of applying a diffusion-inhibiting layer to portions of a plurality of spaced-apart, nanowires of a lithium-accepting composition recited in claim 12 in which the aluminum is applied using a chemical vapor deposition process at a deposition temperature of between 100° C. and 150° C.

17. The method of applying a diffusion-inhibiting layer to portions of a plurality of spaced-apart, nanowires of a lithium-accepting composition recited in claim 12 in which the nanowire is generally circular in cross-section and has a diameter, the diffusion-inhibiting layer having a thickness ranging from about 1 nanometer to about 20% of the nanowire diameter.

18. The method of applying a diffusion-inhibiting layer to portions of a plurality of spaced-apart, nanowires of a lithium-accepting composition recited in claim 12 in which the diffusion-inhibiting layer is applied over between about 5% and 50% of the predetermined length of the nanowire.

19. The method of applying a coating to portions of a plurality of spaced-apart, nanowires of a lithium-accepting composition recited in claim 12 in which the diffusion-inhibiting layer is applied over between about 5% and 15% of the predetermined length of the nanowire.

20. A method of fabricating a negative electrode for a lithium-ion battery, the electrode comprising a plurality of upstanding nanowires of a lithium-accepting composition comprising silicon or tin, the nanowires having a length and being coated over a portion of the length with a layer of material for inhibiting diffusion of lithium into the nanowires, the nanowires being embedded, at an end portion, in a metal current collector, the structure of the electrode serving to reduce the stresses resulting from the expansion of the nanowires during diffusion of lithium into the lithium-accepting composition during charging of the battery, the method comprising the steps of:

preparing a surface of the metal current collector to accommodate end portions of a preselected density of nanowires of the lithium-accepting composition by masking the surface of the current collector with a removable mask adapted to bar access to the metal collector surface except at a plurality generally circular openings in the mask, the density of the mask openings being equal to, or greater than, the preselected nanowire density; then etching the surface of the current collector with a suitable etchant for a predetermined time through the openings in the removable mask, the etchant and mask cooperating to create, at each mask opening, a cavity of suitable depth for the end portions of the nanowires, each cavity extending part-way through the current collector to produce, on the surface of the current collector, a plurality of such cavities;

depositing a metal catalyst within the cavities by chemical or physical vapor deposition, the catalyst being a particle or a nanometer cluster, the catalyst being selected and adapted to promote growth of the nanowires of the lithium-accepting composition;

removing the mask and growing nanowires of the lithium-accepting negative electrode composition from the catalyst particles by physical or vapor deposition, an end of the nanowires being anchored in the cavity and embedded in the current collector;

continuing to grow the nanowires until they extend above the surface of the current collector and achieve a predetermined length above the surface of the current collector; then, applying a removable coating to the current collector surface to encase a first portion of each nanowire proximate the current collector while leaving a second portion of each nanowire accessible for further reaction, the removable coating having a thickness, the thickness being generally equal to the preferred length of the diffusion-inhibiting layer;

applying a thin layer of aluminum to the accessible portion of each nanowire;

anodizing the aluminum coating to render an electrically non-conducting coating of alumina on the accessible portion of each nanowire;

removing the removable coating;

applying, to the first portion of each nanowire, a layer of a diffusion-inhibiting material which will restrict access of lithium to each nanowire, the layer of diffusion-inhibiting material extending from the current collector part-way along the length of the nanowires; and removing the alumina coating.

* * * * *